United States Patent [19]

Eldering et al.

[11] Patent Number: 5,479,451
[45] Date of Patent: Dec. 26, 1995

[54] METHOD AND DEVICE FOR DATA RECOVERY IN BURST MODE COMMUNICATION SYSTEM

[75] Inventors: Charles Eldering, Cantabria; Fernando H. Martin, Portal, both of Spain

[73] Assignee: Alcatel N.V., Netherlands

[21] Appl. No.: 158,708

[22] Filed: Nov. 29, 1993

[30] Foreign Application Priority Data

Dec. 30, 1992 [ES] Spain .................................. P9202649

[51] Int. Cl.$^6$ ............................................. H04L 27/06
[52] U.S. Cl. ........................ 375/343; 375/354; 375/355
[58] Field of Search .................................. 375/113, 114, 375/116, 96, 106, 94, 342, 343, 354, 355, 365, 364, 368, 342, 340; 370/105.4, 105.5, 106, 105.1; 364/728.03

[56] References Cited

U.S. PATENT DOCUMENTS

| | | | |
|---|---|---|---|
| 4,660,164 | 4/1987 | Leibowitz | 364/728.03 |
| 4,829,543 | 5/1989 | Borth et al. | 375/343 |
| 5,347,548 | 9/1994 | Messerges et al. | 375/114 |

OTHER PUBLICATIONS

"A Bit Synchronization Technique for PDS Optical Subscriber Loop Systems": by Masakazu Kitazawa et al., published in the Proceedings of the Workshop on Local Optical Networks by IEEE, Tokyo Japan, 1991. Pp 8.2-1 through 8.2-10.

*Primary Examiner*—Stephen Chin
*Assistant Examiner*—Tesfaldet Bocure
*Attorney, Agent, or Firm*—Ware, Fressola, Van Der Sluys & Adolphson

[57] ABSTRACT

A method for data recovery in burst mode communication systems that include a data signal having a burst preamble with a defined sequence of m bits, by sampling in a first sampling step (2) the burst preamble with n samples per bit carried out by n bit clocks with different phases, and providing a sampled burst preamble. The method is characterized in that it further comprises the steps of correlating in a correlation step (3) the sampled burst preamble with at least n representations of the defined sequence of m-bits of the burst preamble also sampled at n times per bit, each of said at least n representations being delayed one sample clock period with respect to a previous one of said at least n representations in order to obtain at least n time-shifted correlation results; determining in a decision step (4) an optimum phase clock and a first received data bit based on which of said at least n time-shifted correlation results has a greatest value; and regenerating in a regeneration step (5) a sampled data signal sampled at an optimum instant in accordance with the optimum phase clock.

6 Claims, 3 Drawing Sheets

METHOD AND DEVICE FOR DATA RECOVERY IN BURST MODE COMMUNICATION SYSTEM

TECHNICAL FIELD

This invention refers to a method and a device for data recovery in burst mode communication systems, which include a preamble that contains a previously defined sequence and in which this preamble is digitized with a fixed number of samples per bit for subsequent processing to obtain the data and clock signals.

This method is especially applicable to burst mode communication systems in which, for requirements of the system, it is desirable to synchronize the data clock in order to recover the data in a very short time.

BACKGROUND OF THE INVENTION

Historically there have been various methods for data clock recovery whereby the data could be recovered in optimal fashion. These methods required a certain number of bits prior to the information in order to recover the data clock in question.

Frequently the specifications of present-day burst mode communication systems require a very short preamble in order to increase the frame efficiency, and in which the clock signal has to have been recovered in order to regenerate the data.

As a consequence of this, new methods have appeared with the objective of fast recovery of data clock synchronization. Many of these are based on sampling the input data with several samples per bit; these samples are then processed as described in the article "A Bit Synchronization Technique for PDS Optical Subscriber Loop Systems" by Masakazu Kitazawa et al., published in the Proceedings of the "Workshop on Local Optical Networks" by the IEEE, Tokyo, Japan, 1991.

This article, on page 8.2-4, shows a block diagram of a fast bit synchronization circuit in which four bit rate clocks are generated with uniformly distributed phases and which are used for the sampling of the incoming data so that, subsequently, a detector circuit can determine which of the differently phased clocks best adapt to the incoming data.

The operating principle is based, as shown in FIG. 6 of the article mentioned, on carrying out an exclusive-OR function with two consecutive samples to detect the transitions of the data. The results of the preceding operations are progressively stored in a register, decoding of which serves to select the clock with the best phase.

In this method, bit synchronism is achieved after several bit periods.

TECHNICAL PROBLEM TO BE OVERCOME

However, the time required to reach this synchronism with a certain degree of precision, is excessive for certain types of systems, where it could result in the loss of some information bits at the start of the bursts. The technical problem to be overcame, therefore, centers on obtaining data clock synchronization in a time sufficiently short that no information bit is lost in the bit recovery process.

SUMMARY OF THE INVENTION

The problem mentioned above is resolved through the application of the method of the invention which provides fast data clock synchronization, of the order of 3 bits, for correct recovery of the data in a very short period of time.

To this end, the bursts must contain a preamble with a defined sequence of a certain number of bits, the first stage being to sample, with n samples per bit, the preamble corresponding to the received burst with the same number, n, of bit clocks obtained from a single master clock and which have different phases.

This sampled preamble of the burst is correlated with a certain number of representations of the previous defined sequence of the preamble, sampled with the same number n of samples per bit, in which each representation is delayed a sample clock period with respect to the preceding one.

In this way, as many correlation results are obtained as the number of these representations in order to subsequently proceed to decide which, among the n clocks, has the optimum phase, based on which representation originates the correlation with the highest value.

When the number of representations used before are greater than the number of samples per bit, depending on these numbers, it is possible to obtain more than one clock with optimum phase, but in reality they would be the same except that one is delayed with respect to the other by one bit period. Under this condition a decision is also taken, based on the same criteria as before, as to which is the first data bit received.

Once the aforementioned decisions have been taken, regeneration of the incoming data takes place using the recovered clock with optimum phase.

BRIEF DESCRIPTION OF THE DRAWINGS

A more detailed explanation of the invention is to be found in the following description of the invention, based on the following figures, in which.

BEST FOR CARRYING OUT THE INVENTION

Figure 1:
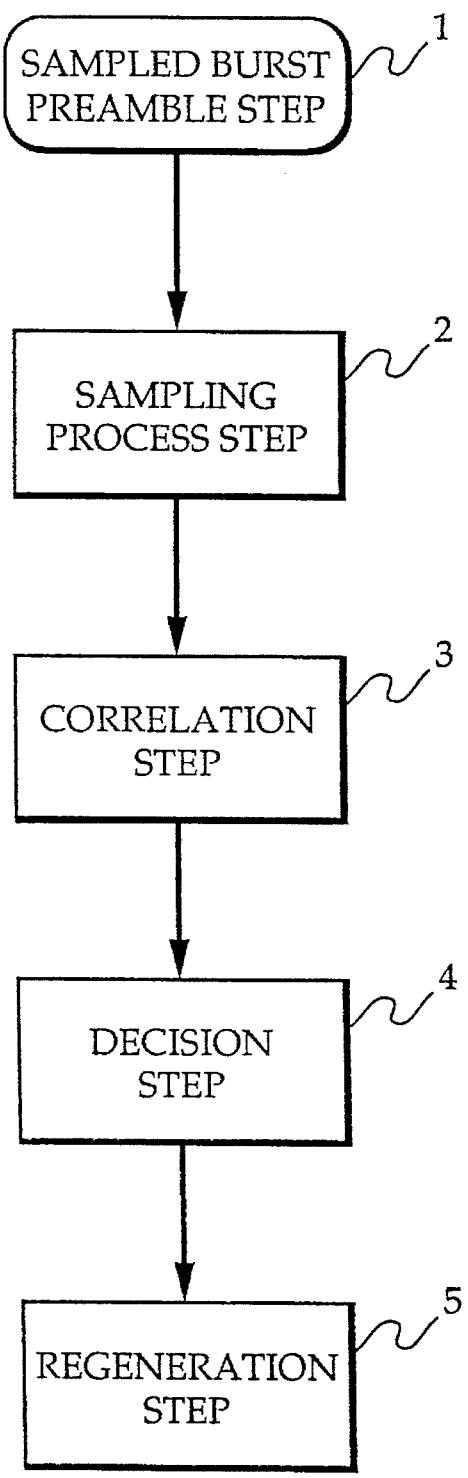
FIG. 1 is a flowchart or the steps to be taken in the method in accordance with the invention.

The method of the invention is characterized in that the succession of steps shown in the flowchart of FIG. 1 in which, on block 1, which represents the preamble of the received burst, a sampling process 2 is carried out with n samples per bit, by means of n bit clocks with different phases, in order to proceed with a correlation 3 of this sampled burst preamble 1, with a set of digitized representations in order to obtain, in this way, the same number of correlation results as there are representations and then proceed to the decision 4 for the optimum phase clock, among the n available clocks, and of the first received data bit, based on which is the result with greatest correlation.

Finally, regeneration 5 takes place of the received data sampled at the optimum moment, in accordance with the decision 4 taken in the previous stage.

Figure 2:
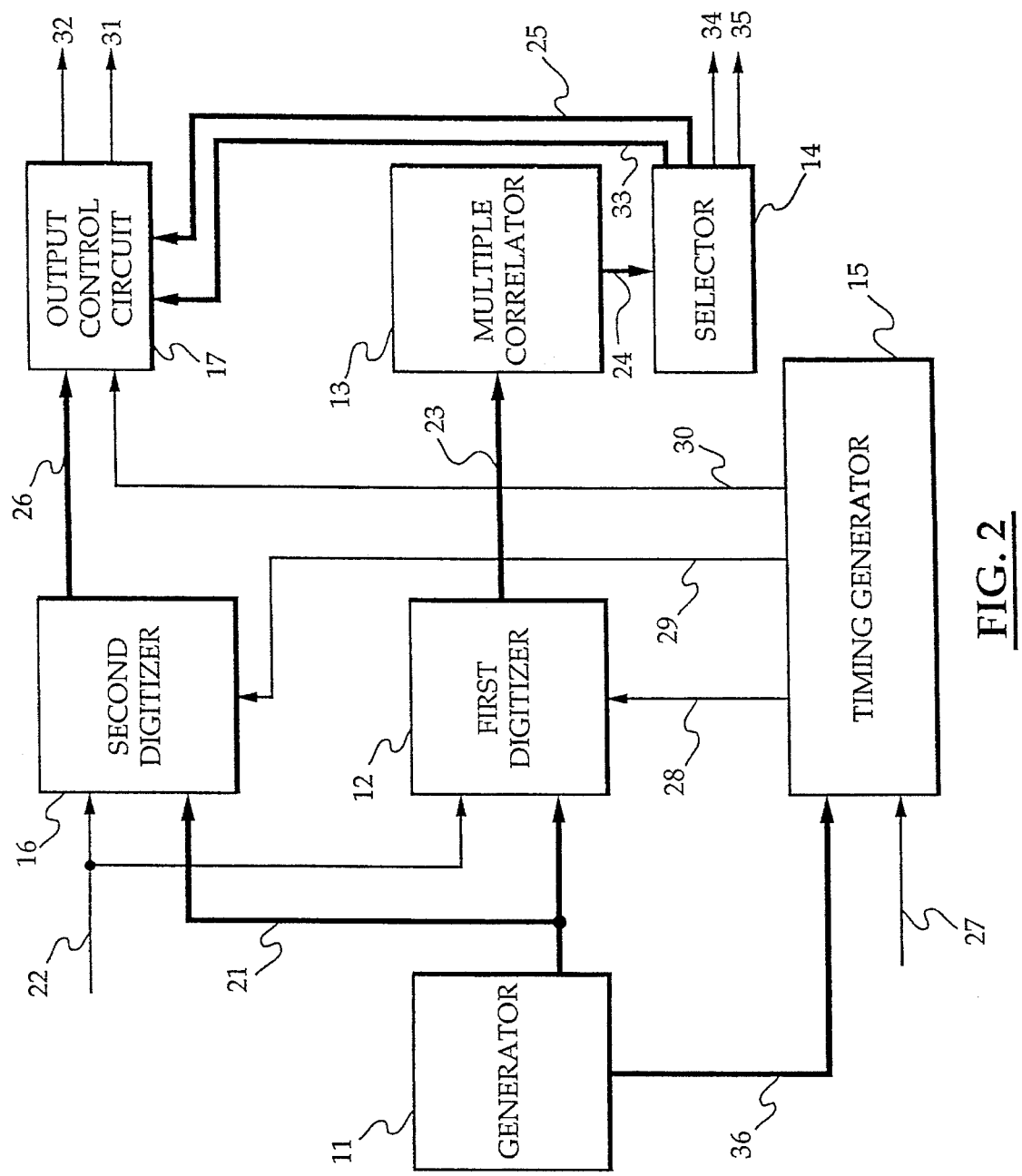
FIG. 2 is a block diagram of a device that performs the method of the invention.

Next, a device is described that implements the method described above, based on the block diagram in FIG. 2.

In the diagram mentioned, the incoming data 22, that include a preamble with a defined sequence of m bits, are applied to a first digitizer 12 to which are also applied the n bit clocks 21 from an n-bit clock signal generator 11 for digitizing this preamble. There is also a timing generator 15 that receives a burst start indication signal 27 and part of the n clocks 36, and that generates, in turn, a first control signal 28 to enable the first digitizer 12 during a time window in which the defined sequence of the burst preamble is expected.

When this happens, the digitized preamble 23 appears at the output of the first digitizer 12 for correlation in a multiple correlator 13 with a certain number of representations of the known sequence of the burst preamble, also sampled n times per bit and in which each representation is delayed one sample with respect to the preceding one. In this way as many correlation results 24 are obtained as there are representations of the preamble, being analyzed in a selector 14 that decides, based on which of these is the largest, the optimum phase clock 25 for the subsequent regeneration of the received data.

The selector 14 also generates an advance 34 or retard 35 signal of the burst preamble with respect to the central representation used in the multiple correlator 13 and a first data bit indication signal 33. These burst preamble advance 34 or retard 35 signals are activated, respectively, when the representation that produces the greatest correlation has been shifted a certain number of samples to the right or to the left because of a delay that is greater or lesser than that expected in the reception of the corresponding burst.

This device also incorporates a second digitizer 16 that is enabled by a second control signal 29, generated by the timing generator 15, for digitizing the incoming data 22 with the n bit clocks 21, once the preamble has been excluded.

The digitized data 26 coming from the second digitizer 16 are applied over an n-line parallel bus to an output control circuit 17 that also receives the indication of optimum phase clock 25 and the indication of the first data bit 33 coming from the selector 14, together with a third control signal 30 from the timing generator 15; all the foregoing being used to present at its output the recovered data clock 31 and those data sampled at the optimum instant 32.

Figure 3:
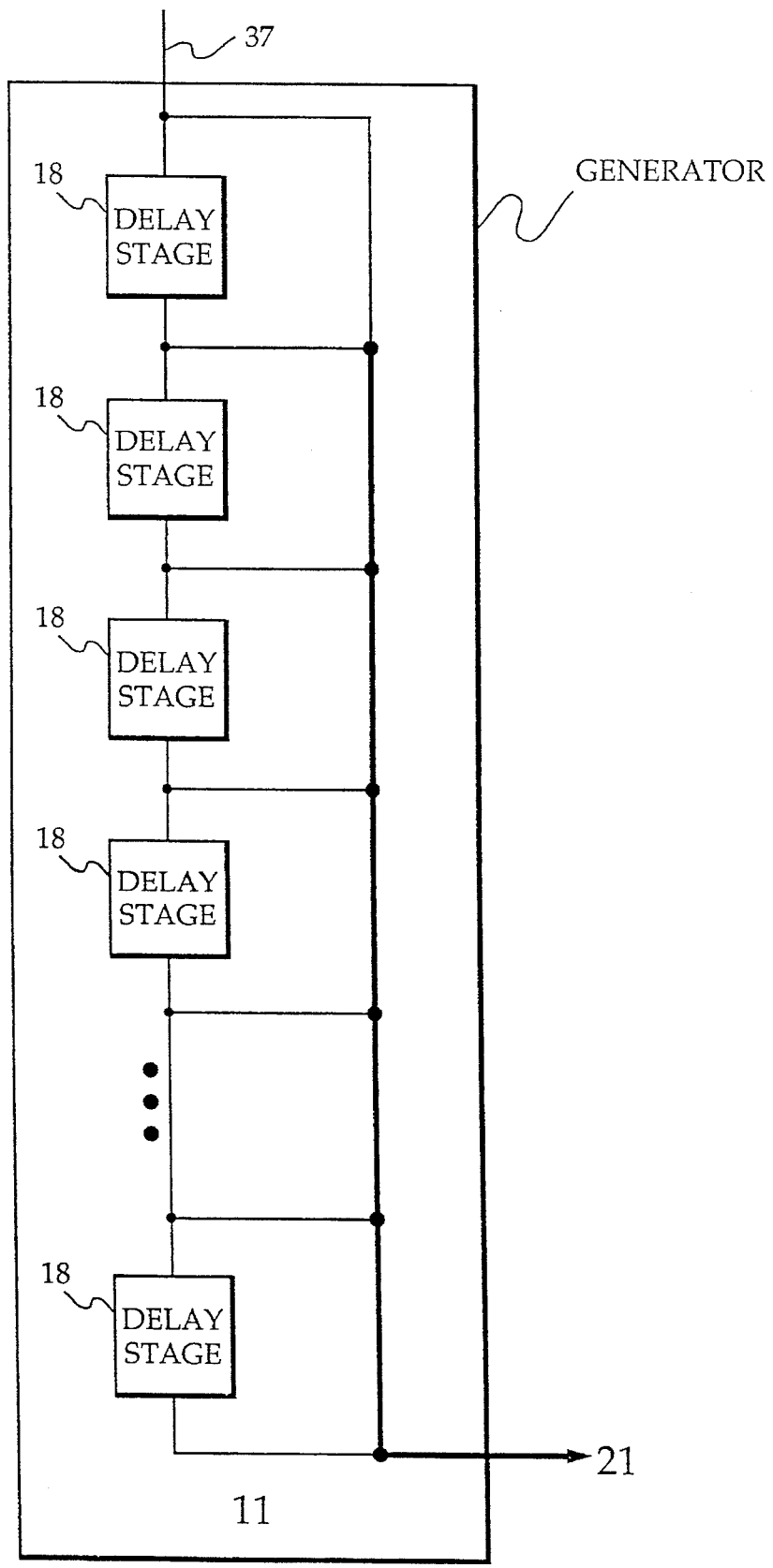
FIG. 3 shows a block diagram of a possible implementation of the clock generator of block 11, in accordance with the invention.

In addition, FIG. 3 shows the composition of the n-bit clock signal generator 11 of the n clocks 21 with different phases, which is done by cascading n-1 delay stages 18, each one producing a delay equal to the bit clock period divided by n. The n clocks 21 are therefore the outputs of these n-1 delay stages 18 plus the input signal to the first stage 37 that comes from a bit master clock.

We claim:

1. A method for data recovery in burst mode communication systems that include a data signal having a burst preamble with a defined sequence of m bits, and including the steps of sampling in a first sampling step (2) the burst preamble with n samples per bit carried out by n bit clocks with different phases and providing a sampled burst preamble, characterized in that the method further comprises the additional steps of:

correlating in a correlation step (3) the sampled burst preamble with at least n representations of the defined sequence of m-bits of the burst preamble also sampled at n times per bit, each of said at least n representations being delayed one sample clock period with respect to a previous one of said at least n representations in order to obtain at least n time-shifted correlation results;

determining in a decision step (4) an optimum phase clock and a first received data bit based on which of said at least n time-shifted correlation results has a greatest value; and regenerating in a regeneration step (5) a sampled data signal sampled at an optimum instant in accordance with the optimum phase clock.

2. A device for data recovery in burst mode communication systems, that comprises a generator (11) of n bit clocks (21) with different phases, and a first digitizer (12) that receives an incoming data signal (22) that include a preamble with a defined m-bit sequence and that receives the n bit clocks (21) with different phases, and that provides a digitized preamble (23) with n samples per bit on a parallel bus of m times n samples, characterized in that the device further comprises:

a multiple correlator (13), responsive to the digitized preamble (23) coming from the first digitizer (12), for correlating the digitized preamble with at least n representations of the defined m-bit sequence of the preamble, each of said at least n representations being delayed one sampling clock period with respect to the previous one of said at least n representations, and providing at least n time-shifted correlation results;

a timing generator (15) that receives a burst start indication signal (27) and part of the n clocks (36), and which generates a first control signal (28) to enable the first digitizer (12), and a selector (14) that receives the at least n time-shifted correlation results (24) and determines which of the at least n time-shifted correlation results (24) is the largest and, generates an optimum phase clock signal (25) at its output.

3. A device according to claim 2, characterized in that:

the device also includes a second digitizer (16) that also receives the incoming data signal (22) and the n clock signals (21) and provides on a parallel bus a digitized data signal (26) sampled n times per bit;

the timing generator (15) also generates a second control signal (29) to enable the second digitizer (16); and the device also includes an output control circuit (17) that receives the digitized data signal (26), the optimum phase clock indication signal (25) and an enable control signal (30) from the timing generator (15), for providing a recovered data clock signal (31) and a sampled data signal (32) sampled at an optimum instant.

4. A device according to claim 2, characterized in that the selector (14) also generates a burst preamble advance signal and a burst preamble retard signal indicating whether the digitized preamble (23) is advanced of or retarded to a central representation of at least n representations of the defined m-bit sequence of the preamble used by the multiple correlator (13) to correlate the digitized preamble.

5. A device according to claim 3, characterized in that when the representations of the defined m-bit sequence of the preamble used in the multiple correlator (13) cover a shift greater than one bit, the selector (14) generates a number of first data bit indication signals (33) that are sent to the output control circuit (17), in order to decide when the first data bit has to be sent out.

6. A device according to claim 2, characterized in that the generator (11) of n clocks (21) with different phases consists of n-1 delay stages (18) connected in cascade, each one with a delay n times less than the bit clock period, the n bit clocks (21) being the output of each of the n-1 delay stages (18) plus the input signal to the first stage (37).

* * * * *